United States Patent
Kono et al.

(10) Patent No.: US 8,917,168 B2
(45) Date of Patent: Dec. 23, 2014

(54) PANEL DEVICE

(71) Applicant: KYOCERA Corporation, Tokyo (JP)

(72) Inventors: Kenji Kono, Yokohama (JP); Jun Takeda, Yokohama (JP); Ryoichi Yokoyama, Kakogawa (JP); Yoshihiro Inokuma, Kirishima (JP); Shinya Nakamura, Kirishima (JP); Kazunari Ikeda, Hikone (JP)

(73) Assignee: KYOCERA Corporation, Kyoto (JP)

( * ) Notice: Subject to any disclaimer, the term of this patent is extended or adjusted under 35 U.S.C. 154(b) by 44 days.

(21) Appl. No.: 13/851,093

(22) Filed: Mar. 26, 2013

(65) Prior Publication Data

US 2013/0257601 A1  Oct. 3, 2013

(30) Foreign Application Priority Data

Mar. 27, 2012  (JP) .................................. 2012-071960

(51) Int. Cl.
  *G08B 6/00* (2006.01)
  *G06F 3/01* (2006.01)

(52) U.S. Cl.
  CPC . *G08B 6/00* (2013.01); *G06F 3/016* (2013.01)
  USPC ...................... 340/407.1; 340/407.2; 715/701; 715/702; 345/173; 463/30

(58) Field of Classification Search
  USPC ......... 340/407.1, 407.2, 683, 686.3; 715/701, 715/702; 463/30; 345/173
  See application file for complete search history.

(56) References Cited

U.S. PATENT DOCUMENTS 6,911,973 B2 *  6/2005  Katsuki et al. ................ 345/177
2002/0101408 A1 *  8/2002  Sano et al. .................... 345/173

FOREIGN PATENT DOCUMENTS

JP          4633167 B2     2/2011

* cited by examiner

*Primary Examiner* — Toan N Pham
(74) *Attorney, Agent, or Firm* — Studebaker & Brackett PC

(57) ABSTRACT

A panel device 10, which is capable of increasing vibration amplitude of a panel without increasing power consumption of a piezoelectric element, includes a panel 11 rectangular in shape and piezoelectric elements 12, 13 also rectangular in shape disposed on the panel 11 for vibrating the panel 11, such that each of the piezoelectric elements 12, 13 is disposed having one side at a slant relative to one side of the panel 11.

8 Claims, 3 Drawing Sheets

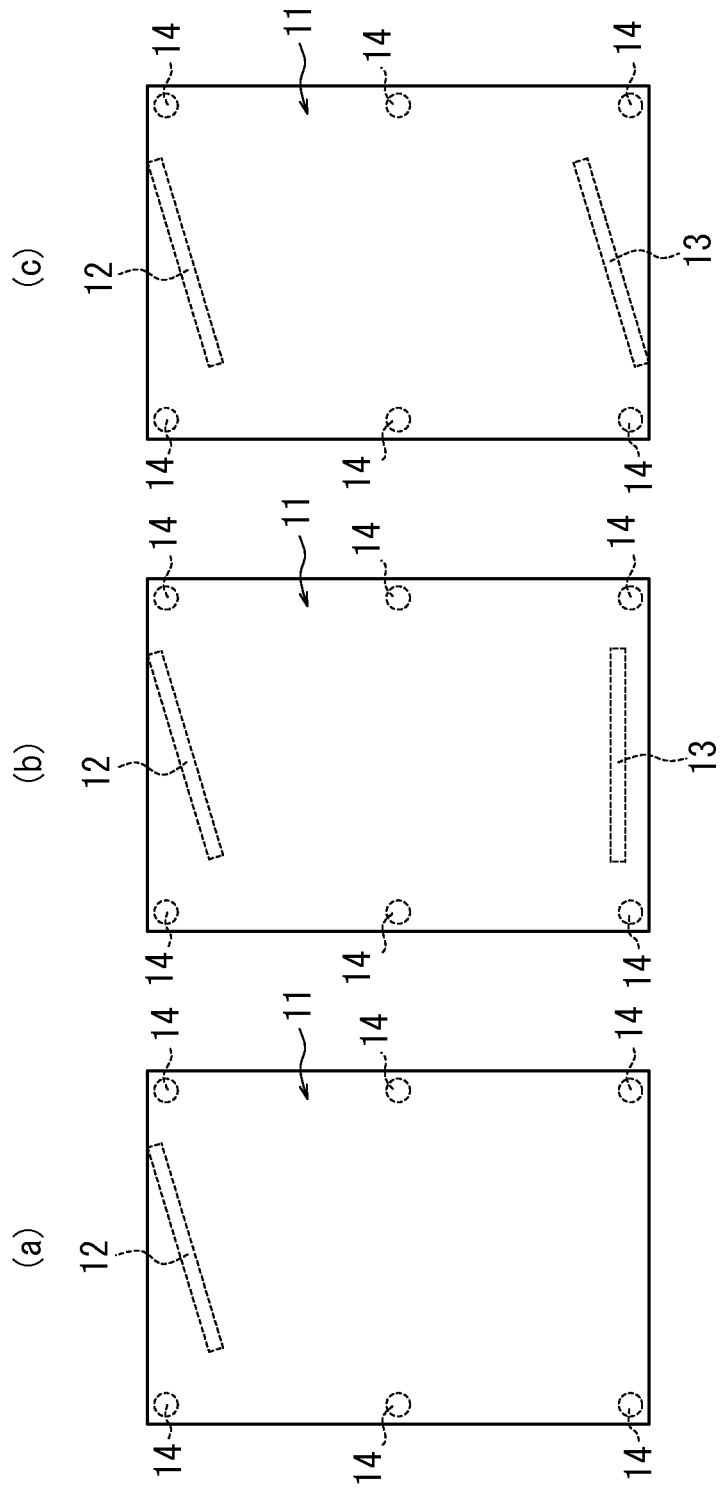

PANEL DEVICE

CROSS REFERENCE TO RELATED APPLICATION

This application claims priority to and the benefit of Japanese Patent Application No. 2012-071960 (filed on Mar. 27, 2012), the entire content of which is incorporated herein by reference.

FIELD

The embodiment discussed herein relates to a panel device having a vibrating function for vibrating a panel.

BACKGROUND

Electronic devices such as, for example, a mobile phone, a smart phone, a tablet, a gaming machine, a PC (Personal Computer), an ATM (Automatic Teller Machine), a ticket vending machine, a vending machine, a printer, a copy machine, a FAX (facsimile) and a home appliance which use a panel such as a touch panel, a touch switch or the like for detecting an input operation by an operator have been increasingly used in recent years.

Also, it is suggested that a panel device having a vibration function for providing a tactile sensation to the operator by vibrating the panel when there is an input operation of a contact to the panel by a contact object such as an operator's finger, a stylus pen and the like be mounted on the electronic devices (for example, see Patent Document 1).

Patent Document 1: Japanese Patent No. 4633167

SUMMARY

The panel device disclosed in Patent document 1 has long piezoelectric elements disposed parallel to sides of a rear face of a rectangular panel near centers of the sides. When the operator operates the panel by using the contact object, the piezoelectric elements are driven to vibrate the panel in a curved manner, such that a tactile sensation is provided to the operator.

The panel device having such a vibration function is required to vibrate the panel in a curved manner with sufficient amplitude such that the tactile sensation is unfailingly provided to the operator. To that end, it is assumed to increase a driving voltage of the piezoelectric element. However, increasing the driving voltage may increase power consumption. As a result, when the panel device is mounted on a mobile electronic device having a battery as a power source, there may be a concern that the battery lasts for only a short time.

Such a condition being taken into consideration, a panel device is provided, which is capable of increasing the vibration amplitude of the panel without increasing the power consumption of the piezoelectric element.

A panel device according to a first aspect includes a rectangular panel and a rectangular piezoelectric element disposed on the panel for vibrating the panel. The piezoelectric element is disposed having one side at a slant relative to one side of the panel.

According to a second aspect of the panel device, an angle of the one side of the piezoelectric element relative to the one side of the panel is a predetermined degree or larger.

According to a third aspect of the panel device, both of the panel and the piezoelectric element are rectangular in shape, and the piezoelectric element is disposed on a short side of the panel.

According to a fourth aspect of the panel device, the piezoelectric element is disposed having a longitudinal side at a slant relative to the short side of the panel at the predetermined degree or larger.

According to a fifth aspect of the panel device, the piezoelectric element is disposed on each of opposing short sides of the panel, and an extended line of a long side of one of the piezoelectric elements and an extended line of a long side of the other piezoelectric element cross each other.

According to a sixth aspect of the panel device, one of the piezoelectric elements is disposed having the long side at a slant relative to the short side of the panel at a first degree in a first direction, and other piezoelectric element is disposed having the long side at a slant relative to the short side of the panel at a second degree in a second direction opposite to the first direction.

According to a seventh aspect of the panel device, the first degree and the second degree are in accord with each other.

According to an eighth aspect of the panel device, the piezoelectric element is disposed at a position shifted from a center of a corresponding side of the panel.

BRIEF DESCRIPTION OF THE DRAWINGS

FIGS. 4(a) to (c) are diagrams illustrating three exemplary variations of the panel device illustrated in FIG. 1.

DESCRIPTION OF EMBODIMENT

According to an embodiment discussed herein, the vibration amplitude of the panel may be increased without increasing the power consumption of the piezoelectric element.

An embodiment will be described with reference to the accompanying drawings.

Figure 1:
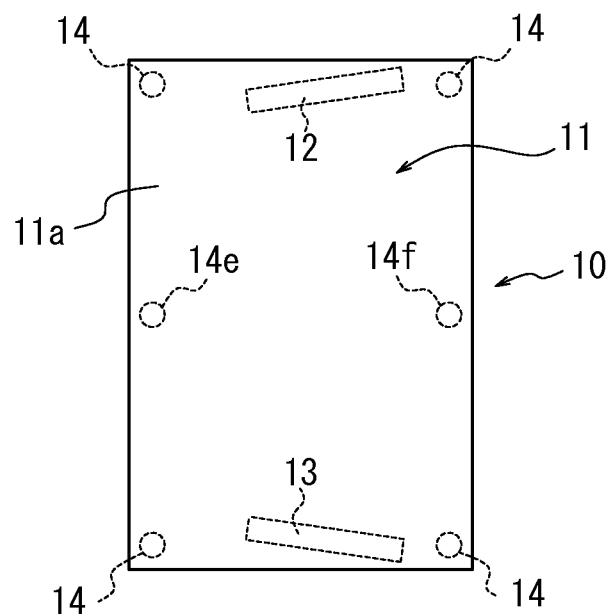
FIG. 1 is a plane view illustrating a schematic configuration of a panel device according to one embodiment of the present invention.
Figure 2:
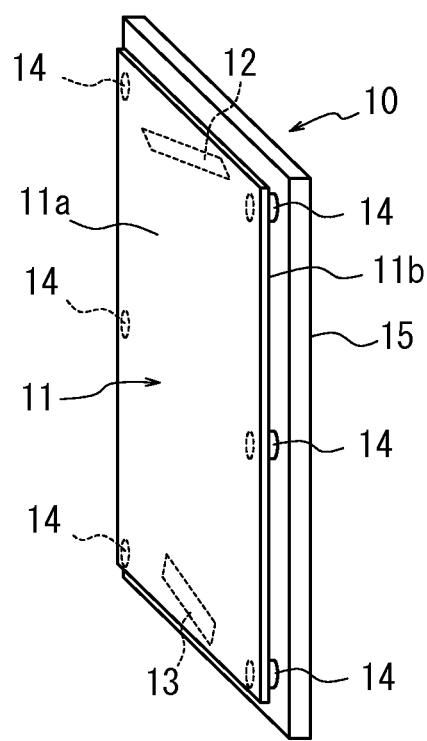
FIG. 2 is a perspective view of the panel device in FIG. 1.

FIG. 1 is a plane view and FIG. 2 is a perspective view both illustrating a schematic configuration of a panel device according to one embodiment. A panel device 10 according to the present embodiment includes a panel 11 rectangular in shape. The panel 11 may be of such a type as a resistive film type and a capacitive type. In the present embodiment, the rectangular shape includes one with rounded corners.

The panel 11 has a panel rear face 11b, opposite to an operation plane (front face) 11a, having two piezoelectric elements 12, 13 disposed thereon. The piezoelectric elements 12, 13, having a configuration such as a monomorph, bimorph or unimorph in a long rectangular shape, expand and contract in a longitudinal direction upon application of a voltage. The piezoelectric element 12 has one plane fixedly adhered in such a manner that a longitudinal side thereof is at a slant relative to one of opposing short sides of the panel rear face 11b. Similarly, the piezoelectric element 13 has one plane fixedly adhered in such a manner that a longitudinal side thereof is at a slant relative to the other short side of the panel rear face 11b. Detailed arrangements of the piezoelectric elements 12, 13 will be described below.

The panel 11, at six positions consisting of four corners and a center of each of the long sides of the panel rear face 11b, is supported by a fixing unit 15 via support members 14 that may be elastically deformed. That is, the panel 11 is supported by the six support members 14 at the six positions on the fixing unit 15. Here, a distance between two support members 14 on the short side of the panel 11 is longer than a distance between two support members 14 on the long side. Although the support member 14 is in a cylindrical shape as an example, the support member 14 may take any shape such as a rectangular column.

The fixing unit 15 may include a display panel such as a liquid crystal display, an organic EL display, an electronic paper or the like and supports the panel 11 in an area outside a display area via the support members 14.

Here, examples of the arrangement of the piezoelectric elements 12, 13 on the panel 11 will be described in detail with reference to FIGS. 3(a) and 3(b).

FIGS. 3(a) and 3(b) are diagrams for illustrating examples of the arrangement of the piezoelectric elements 12, 13 on the panel 11 viewed from the operation plane 11a of the panel 11. FIG. 3(a) illustrates a comparative example of the arrangement. In FIG. 3(a), the piezoelectric elements 12, 13 are disposed at centers of opposing short sides of the panel 11 in such a manner that long sides thereof stretch parallel to the short sides. Hereinafter, the arrangement of the panel device illustrated in FIG. 3(a) is referred to as a standard model, for convenience sake.

FIG. 3(b) illustrates an example of the arrangement of the piezoelectric elements 12, 13 on the panel device 10 according to the present embodiment. In FIG. 3(b), the piezoelectric element 12 is disposed with its longitudinal direction rotated counterclockwise (in a first direction) by a first degree α1 from its orientation of the standard model when viewed from the operation panel 11a of the panel 11. Further, the piezoelectric element 12, when necessary, may be disposed at a position shifted from a center of the short side of the panel 11 in a short side direction (x) and/or a long side direction (y). On the other hand, the piezoelectric element 13 is disposed with its longitudinal direction rotated clockwise (in a second direction) by a second degree α2 from its orientation of the standard model when viewed from the operation panel 11a of the panel 11. Further, the piezoelectric element 13, when necessary, may be disposed at a position shifted from the center of the short side of the panel 11 in the short side direction (x) and/or the long side direction (y). Hereinafter, the arrangement of the panel device illustrated in FIG. 3(b) is referred to as an embodiment model, for convenience sake.

Table 1 illustrates results of vibration examinations of the standard model illustrated in FIG. 3(a) and the embodiment model illustrated in FIG. 3(b).

TABLE 1

|  | x1 | x2 | x3 |
| --- | --- | --- | --- |
| y1 | 108.7 | 104.3 | 99.8 |
| y2 | 101.0 | 101.9 | 101.6 |
| y3 | 113.3 | 104.0 | 99.6 |

The results of the vibration examinations illustrated in Table 1 indicate an increased amount of the vibration amplitude of the embodiment model on percentage (%) in comparison to that of the standard model as a standard. The same driving voltage of the piezoelectric elements 12, 13 is used for both of the standard model and the embodiment model. According to the standard model and the embodiment model, the panel 11 is rectangular in shape and 62.7 mm on short sides and 119.35 mm on long sides, and each of the piezoelectric elements 12, 13 is rectangular in shape and 2.6 mm on short sides and 40 mm on long sides. According to the embodiment model, both of the first angle α1 of the piezoelectric element 12 and the second angle α2 of the piezoelectric element 13 are 6 degrees. According to the embodiment model, also, the piezoelectric element 12 is disposed at a position shifted from its position of the standard model by 5 mm in a right (x+) direction and 3 mm in an upper (y+) direction. The piezoelectric element 13 is disposed at a position shifted from its position of the standard model by 5 mm in the x+ direction and 3 mm in a downward (y−) direction.

Also, measuring positions of the vibration amplitude, as illustrated in FIGS. 3(a) and (b), are at intersections of positions x1, x2 and x3 in the x direction of the panel 11 and positions y1, y2 and y3 in the y direction, respectively. Here, the position x2 passes through the center of the short side of the panel 11, and the positions x1 and x3 are located at the same distance from the position x2 close to the long sides. Similarly, the position y2 passes through the center of the long side of the panel 11, and the positions y1 and y3 are located at the same distance from the position y2 close to the short sides.

As seen in Table 1, according to the embodiment model, since the piezoelectric elements 12, 13 are arranged having their longitudinal directions stretches along the opposing short sides of the panel 11 at a slant relative thereto, by the piezoelectric elements 12, 13 curving, the panel 11 may bend on its long sides as well as on its short sides. Further, since the piezoelectric elements 12, 13 are disposed at positions laterally and longitudinally shifted from the centers of the short sides of the panel 11, a distribution of the vibration amplitude by the curve on the plane of the panel 11 may be adjusted. In a case of Table 1, an average increase rate of the vibration amplitude of the panel 11 is 103.7%. Accordingly, the vibration amplitude of the panel 11 may be increased without increasing power consumption of the piezoelectric elements 12, 13, and thus the tactile sensation may be unfailingly provided to an operator of the panel 11.

FIGS. 4(a) to 4(c) are diagrams illustrating three exemplary variations of the panel device illustrated in FIG. 1. FIG. 4(a) illustrates a structure in which one piezoelectric element 12 is disposed with its longitudinal direction stretching along one of the short sides of the rear face of the panel 11 at a slant relative thereto and, when necessary, piezoelectric element 12 is shifted laterally and longitudinally from the center of the short side.

FIG. 4(b) is a diagram illustrating a structure having the piezoelectric element 13 in addition to the structure illustrated in FIG. 4(a). The piezoelectric element 13 is disposed with its longitudinal direction stretching parallel to the other short side of the rear face of the panel 11 and, when necessary, the piezoelectric element 13 is shifted laterally and longitudinally from the center of the short side.

FIG. 4(c) is a diagram illustrating a structure in which the piezoelectric element 13 in the structure illustrated in FIG. 4(b) is rotated in the same direction as that of the piezoelectric element 12 in such a manner that its longitudinal direction stretches along the short side of the panel 11 at a slant relative thereto. Here, the piezoelectric element 13 may be disposed with a different rotation angle as that of the piezoelectric element 12 or the same rotation angle to be parallel to the piezoelectric element 12.

Figure 3:
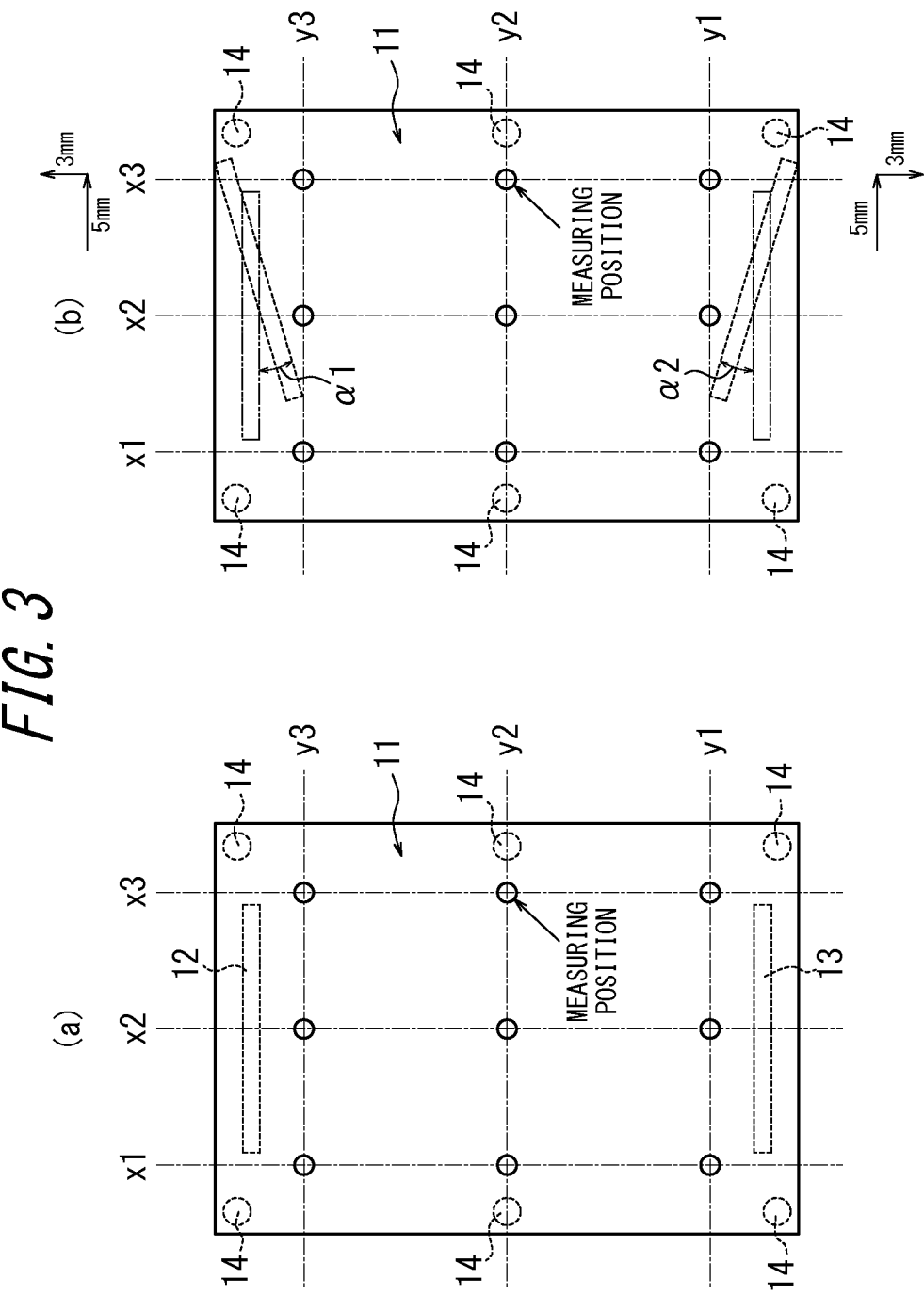
FIGS. 3(a) and (b) are diagrams for illustrating examples of arrangement of piezoelectric elements on a panel in FIG. 1.

With the structures illustrated in FIGS. 4(a) to 4(c), in the same manner as that described with reference to FIG. 3, the vibration amplitude of the panel 11 may be increased without increasing the power consumption. Accordingly, the tactile sensation may be unfailingly provided to the operator of the panel 11.

It is to be understood that a technical scope of the above embodiment may be modified or varied in a multiple of manner. For example, the panel is not limited to be in the above size but may be in any size and may be supported at 8 or 10 positions including 4 corners, according to the size. Also, the piezoelectric elements, according to the size of the panel, desired vibration amplitude and the like, may be disposed on one side, two sides, three sides or each side of the panel. A plurality of piezoelectric elements may be disposed on one side, or on the short sides.

The panel device according to the embodiment is applicable also to an electronic device that has the piezoelectric element functioning as a pressure detection element and, when data based on a pressure on the panel created by the piezoelectric element satisfies a predetermined standard, as a vibration element for vibrating the panel. According to such an electronic device, when the piezoelectric element functions as the vibration element, the vibration amplitude of the panel may be efficiently increased as described above. Therefore, when the piezoelectric element functions as the pressure detection element, the sensitivity of the pressure detection on the panel may be increased. Accordingly, highly accurate data about the pressure may be obtained, thus the tactile sensation may be controlled in a highly accurate manner.

Also, since the panel device may efficiently increase the vibration amplitude of the panel, the panel device is applicable, as well as to a tactile sensation transmission technique for providing (transmitting) the tactile sensation to the operator, to a speaker technology for generating sound by vibrating the panel or a bone conduction technique that enables to hear the sound through bone conduction by vibrating the panel. Further, the panel device is applicable also to a technology for vibrating the panel by applying a predetermined electric signal (audio signal) on the piezoelectric element and for transmitting the vibration of the panel to a human body such that air vibration sound and human body vibration sound are transmitted to a user.

What is claimed is:

1. A panel device comprising:
   a rectangular panel; and
   a rectangular piezoelectric element disposed on the panel for vibrating the panel, wherein
   the piezoelectric element is disposed having one side at a slant relative to one side of the panel.

2. The panel device according to claim 1, wherein an angle of the one side of the piezoelectric element relative to the one side of the panel is a predetermined degree or larger.

3. The panel device according to claim 1, wherein
   both of the panel and the piezoelectric element are rectangular in shape, and the piezoelectric element is disposed on a short side of the panel.

4. The panel device according to claim 3, wherein the piezoelectric element is disposed having a longitudinal side at a slant relative to the short side of the panel at the predetermined degree or larger.

5. The panel device according to claim 4, wherein
   the piezoelectric element is disposed on each of opposing short sides of the panel, and
   an extended line of a long side of one of the piezoelectric elements and an extended line of a long side of the other piezoelectric element cross each other.

6. The panel device according to claim 5, wherein
   one of the piezoelectric elements is disposed having the long side at a slant relative to the short side of the panel at a first degree in a first direction, and
   other piezoelectric element is disposed having the long side at a slant relative to the short side of the panel at a second degree in a second direction opposite to the first direction.

7. The panel device according to claim 6, wherein the first degree and the second degree are in accord with each other.

8. The panel device according to claim 1, wherein the piezoelectric element is disposed at a position shifted from a center of a corresponding side of the panel.

* * * * *